Jan. 9, 1951   L. M. RABINOWITZ   2,537,280
VARIABLE DRIVE CLUTCH FOR STITCH CONTROL
Filed Sept. 21, 1948   2 Sheets-Sheet 2
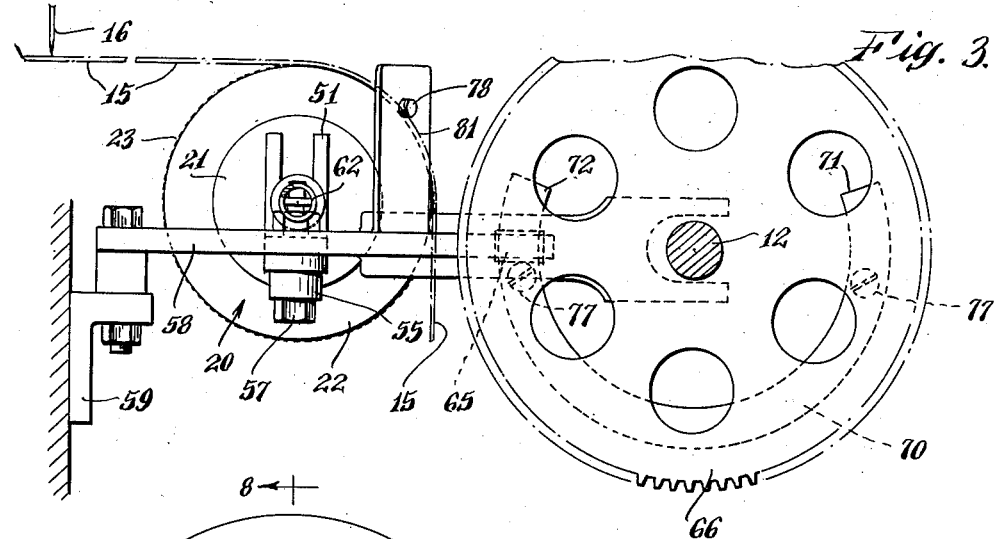
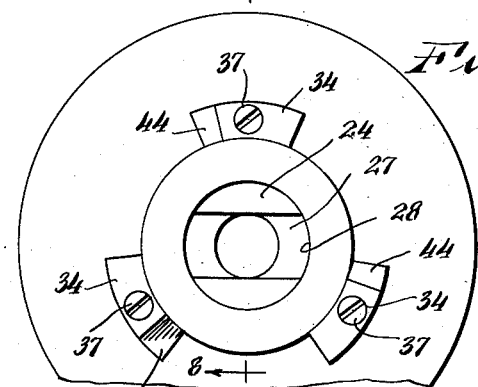
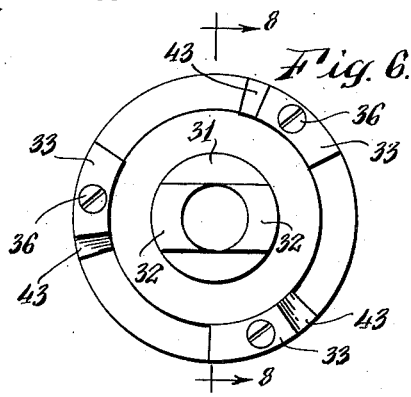
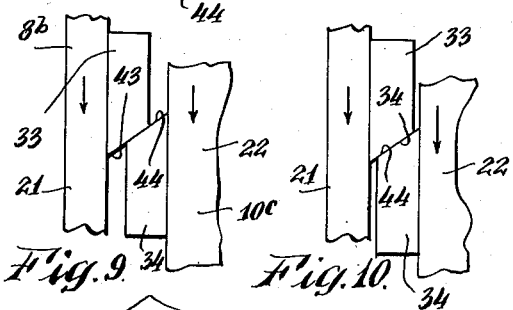
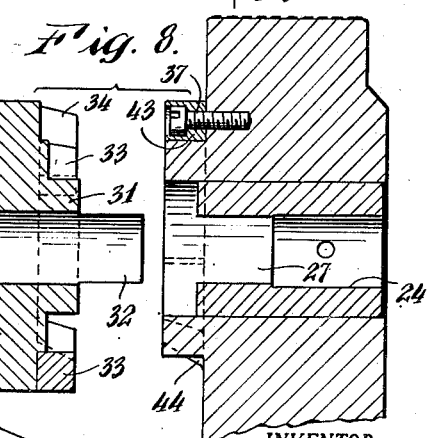
INVENTOR.

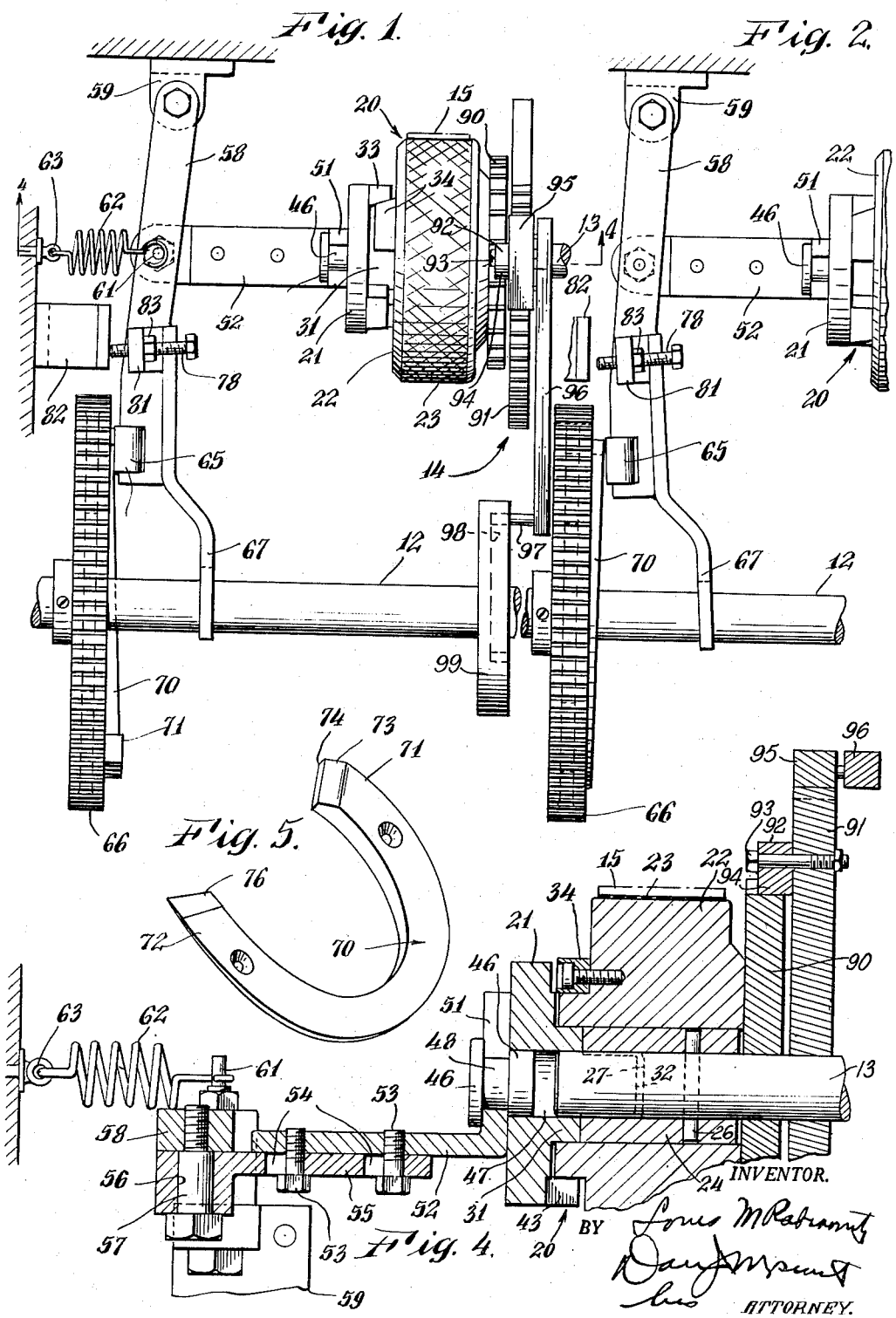

Patented Jan. 9, 1951

2,537,280

UNITED STATES PATENT OFFICE 2,537,280

VARIABLE DRIVE CLUTCH FOR STITCH CONTROL

Louis M. Rabinowitz, Brooklyn, N. Y., assignor to Louis M. Rabinowitz Foundation, Inc., Dover, Del., a corporation of Delaware Application September 21, 1948, Serial No. 50,331

5 Claims. (Cl. 74—125.5)

This invention relates to stitching or sewing machines, and more particularly to novel means for varying the length of adjacent stitches in a seam.

The invention is particularly applicable to seam stitching apparatus in which a seam is formed in an article, as for example a folded tape, and fastener means or the like secured thereto in pockets formed at intervals along the seam. If the seam stitches are closely spaced, it is desirable to lengthen the stitch length when the seam crosses arms of the wire loops of the fasteners, which, for example, may be wire hooks or eyes which are disposed within the pockets aforesaid.

In such apparatus, a suitable friction roller is used to draw the article lengthwise beneath the stitching mechanism forming the seam. The roller is rotated step-by-step to draw the tape under tension from a feed source, with the stitching means forming a stitch while the tape is at rest between successive stitches.

In order to vary the stitch length, the present invention provides novel means for selectively imparting a greater-than-normal or less-than-normal rotation to the roller where it is desired to form longer or shorter stitches, respectively. A preferred means for accomplishing this result is a novel clutch and an associated cam actuated clutch operator.

Specifically, the aforementioned stepping means drives the roller through a variable stroke clutch. This clutch comprises a driving member attached to the stepping means and a driven member integral with or secured to the roller. The two members carry cooperating teeth having sloped surfaces, so that axial movement of the members toward each other will impart an additional increment of rotation to the driven member, while axial separation of the clutch members will decrease the rotational movement of the driven member on the next stroke of the stepping means. Preferably, relative axial movement of the clutch members is effected by a clutch lever controlled by a cam operated by suitable timing mechanism, and means are provided for selectively varying the stroke of the clutch lever, or for maintaining it against operation.

With the foregoing in mind, an object of the invention is to provide novel means for varying the stroke of a step-by-step actuated rotatable member.

Another object is to provide a novel stitch length selector and controller for seam stitching apparatus.

These, and other objects, advantages and novel features of the invention will be apparent from the following description and the accompanying drawing. In the drawing:

Fig. 1 is a partial plan view of apparatus incorporating the invention, showing the clutch in one position.

Fig. 2 is a view similar to Fig. 1 showing the clutch in another position.

Fig. 3 is a left end elevation view of the clutch and its operating mechanism.

Fig. 4 is a vertical sectional view on the line 4—4 of Fig. 1, looking in the direction of the arrows.

Fig. 5 is a perspective view of a clutch operating cam.

Figs. 6 and 7 are elevation views of the driving and driven elements, respectively, of the clutch.

Fig. 8 is a sectional exploded view of the clutch along the lines 8—8 of Figs. 6 and 7.

Figs. 9 and 10 are enlarged partial side elevation views of the clutch elements in two different positions.

Fig. 11 is a perspective view of a stitched article showing a seam having stitches of different lengths.

Referring to the drawings, a main drive shaft 12 imparts a step-by-step rotation to a drive shaft 13 through a ratchet mechanism generally indicated at 14. The rotation of shaft 13 is clockwise when viewed from the left of Figs. 1, 2 and 4. A driving element 21 of a clutch 20 is secured to shaft 13 and is arranged to drive the clutch driven element 22. The latter has a knurled, cylindrical periphery 23 acting as a feeding surface for drawing folded tape 15 past a stitching needle, such as 16. As will be described, clutch 20 is designed to impart shorter or longer impulses to driven member 22 to correspondingly vary the length of stitches 17 in seam 18 of folded tape 15, for example to secure eyelets 19 thereto in the pockets formed thereby.

Referring particularly to Figs. 1 and 3, the ratchet mechanism for imparting a step by step rotation to shaft 13 comprises the following: A gear 90 is keyed to shaft 13, a larger gear 91 (only a portion of the peripheral surface of which has teeth thereon) is mounted adjacent gear 90 for oscillating freely about shaft 13, a pawl 92 is mounted on a pivot bolt 93 extending laterally from one side of gear 91, the nose 94 of pawl 92 being juxtaposed in relation to the teeth at the periphery of gear 90 so that as gear 91 is oscillated in one direction, the said pawl 92 displaces gear 90 and thereby shaft 13 geared thereto, by a step equal to the width of a gear tooth on gear 90, while the pawl rides over the gear teeth of gear 90 when gear 91 is oscillated in the opposite direction. To oscillate gear 91, a tooth rack 95 (the teeth of which mesh with the teeth of gear 91) is mounted on lever 96 for longitudinal reciprocation thereby, said lever having at its other end a pin 97 which rides in internal cam groove 98 of disc 99 which is keyed to shaft 12 for rotation thereby.

Shaft 13 extends through and beyond a sleeve 24 in member 22, and the sleeve is secured to rotate with shaft 13 by means of a pin 26. The outer end of sleeve 24 has an axially elongated, diametric slot 27 of a width slightly less than the diameter of shaft 13 (Figs. 4, 7 and 8). Sleeve 24 has a length less than that of bore 28 of driven member 22, so that a space is left in the outer end of bore 28 to receive the cylindrical hub 31 of driven member 21. The hub has a diametrically opposite pair of arcuate extensions 32 fitting in slot 27 and over the end of shaft 13. Hub 31 is thus slidable axially in bore 28 and over shaft 13 while being drivingly connected to rotate with the shaft by extensions 32 engaged in slot 27.

Clutch members 21, 22 carry circumferentially spaced, cooperating teeth or jaws 33, 34, respectively. It will be noted that the spacing of the clutch teeth on either member is substantially twice the circumferential width of the teeth on the other member. The teeth are secured to the respective members by countersunk studs 36, 37 respectively. Teeth 33 have forward, or driving, sloping surfaces 43 which mate with corresponding surfaces 44 of teeth 34. The described arrangement provides for member 21 to impart a shorter or longer rotation stroke to member 22 in accordance with the relative axial positions of members 21 and 22.

Axial adjustment of clutch members 21, 22 is accomplished in the following manner. A hub member 46 is shrunk, press-fitted, or otherwise secured in the bore 47 of member 21, and has a reduced section 48 and an enlarged head 49. A fork 51, formed as a perpendicular extension of a link 52, fits over section 48 inwardly of head 49. Link 52 carries spaced studs 53 engaged in slots 54 of a second link 55. Studs 53 and slots 54 provide for adjustment of the combined length of links 52 and 55.

The end of link 55 has an aperture 56 which loosely fits a stud 57 carried by a cam lever 58. Lever 58 is pivoted to a bracket 59 and carries a stud 61 over which is hooked one end of a spring 62 connected by an eyebolt 63 to a fixed support. Spring 62, through lever 58, tends to pull clutch members 21, 22 further apart. The free end of lever 58 carries a roller 65 engaging a discontinuous cam 70 on one face of a spur gear 66 secured to rotate with shaft 12. Lever 58, carrying the roller 65, is maintained aligned properly with cam 70 by virtue of a forked extension 67 fitting over shaft 12.

The cam 70 is arc-shaped, and extends through more than 180 degrees of arc. It decreases uniformly in thickness from a thick end 71 to a thin end 72. End 71 has a slope 73 and a perpendicular surface 74. End 72 has a slope 76. Cam 70 is secured to gear 66, with either surface of the cam engaging the gear, by means of countersunk studs 77, 77.

Movement of lever 58 to the left under the influence of spring 62 is limited by a stud 78 in a bracket 81 on the lever. Stud 78 engages a stop 82, and is locked in adjusted position by a lock nut 83. It should be noted that stud 78 may be adjusted to limit the amount of engagement of roller 65 with cam 70, by limiting leftward movement of lever 58. If desired, stud 78 may be so adjusted as to maintain the roller 65 out of contact entirely with cam 70.

The operation of the mechanism is as follows. Assuming that stud 78 is so adjusted that roller 65 does not engage cam 70, shaft 12, through ratchet device 14 imparts a stepping motion to shaft 13. Through clutch 20, this stepping motion imparts uniform rotational steps to clutch driven member 22. This pulls tape 15 to the right (Fig. 3) by an equal amount during each step. While driven member 22 is at rest between steps, the stitching means makes a stitch in tape 15. Under the given conditions, the stitches are all of equal length.

To vary the stitch length, clutch members 21, 22 are adjusted axially relative to each other. Such stitch length variation is particularly useful in stitching eyelets 19 to folded tape 15. To prevent the eyelets from sliding around on the tape, it is desirable to form a pocket receiving the loops 19 on the legs of the eyelet, and to have the stitches so spaced that each leg of the eyelet has a stitch closely adjacent the leg. The stitches 17 of the seam 18, for example, might have a spacing considerably less than the spacing necessary to receive the loops 19' of eyelet between successive stitches. Accordingly, it is desirable to have a longer spacing between the stitches at the eyelet locations.

To achieve this result, cam 70 is secured to gear 66 with thin end 72 as the leading end. The ratchet mechanism 14 is so adjusted that roller 65 reaches the high end 71 of cam 70 just as an eyelet location on tape 15 reaches the stitching mechanism, gear 66 being continually rotated by shaft 12. As roller 65 rides up the slope of cam 70, clutch member 21 is moved progressively toward clutch member 22, so that the cooperating teeth 33, 34 shove clutch member 22 a little further ahead on each stroke of ratchet mechanism 14. This causes surface 23 to draw tape 15 along a progressively greater distance between each stitch.

As the roller nears the high end of cam 70, the stitch spacing just before roller 65 drops off cam end 71 will be sufficient to form pockets receiving the loops 19' on the legs of eyelet 19. When the stitch has been made adjacent the trailing leg of the eyelet, roller 65 drops off cam 70, and clutch member 21 is moved away from clutch member 22. The teeth 33, 34 are now so spaced that there will be no movement of member 22 and tape 15 before the next stitch is made, so that two stitches are made adjacent the trailing leg of eyelet 19. The next succeeding stitches are uniformly spaced, until roller 65 again starts to ride upon cam 70.

The extra length stitch spacing to form the eyelet receiving pocket can also be accomplished in a different manner by removing cam 70 from gear 66 and reversing the cam so that its high end 71 becomes the leading end. The stitches are uniform in length until the stitch at the leading leg of eyelet 19 is to be made. The parts are so adjusted that roller 65 mounts up the cam edge 74 and slope 73 to the high point of the cam, moving clutch member 21 toward clutch member 22, so that cooperating teeth 33, 34 shove member 22 ahead an appreciable amount in addition to the amount the latter is moved by clutch member 21 through ratchet mechanism 14. This pulls tape 15 ahead a much larger amount before the stitch is completed at the leading leg of the eyelet, forming a pocket to receive the eyelet loop 19'. The next stitch is only slightly less in length to receive the loop 19' on the trailing leg of the eyelet. The stitches continue to decrease in spacing as roller 65 rides down cam 70 until the roller passes off low end 72 of the cam. The stitches are then uniform in length until the roller 65 again rides up onto high end 72 of the cam.

Uniform stitch spacing can also be effected by adjusting screw 78 to hold lever 58 in such position that roller 65 no longer engages cam 70. The increase or decrease in stitch length can also be preselected by adjustment of screw 78 so that roller 65 engages or disengages cam 70 at some point intermediate cam ends 71 and 72.

While a specific embodiment of the invention has been shown and described in detail to illustrate the application of the principles thereof, it will be understood that the invention may be otherwise embodied, without departing from such principles.

What is claimed is:

1. Step-by-step rotation apparatus comprising, in combination, a driving shaft; a driven shaft in spaced parallel relation to said drive shaft; means operable by said driving shaft to impart step-by-step rotation to said driven shaft; a clutch having coaxial driving and driven members, said driving member being operable by said driven shaft; interengageable teeth on said members having cooperating sloping teeth, whereby, relative axial adjustment of said members will vary the degree of rotation of said driven member in response to driving impulses from said driving member; a pivotally mounted clutch lever operable to axially adjust said clutch members; cam means rotatable on said driving shaft and engageable with the free end of said lever and selectively operable to activate said lever to axially adjust said clutch members; and a forked arm on said lever fitting over said driving shaft to maintain said lever aligned with said cam means.

2. Step-by-step rotation apparatus comprising, in combination, a driving shaft; a driven shaft in spaced parallel relation to said drive shaft; means operable by said driving shaft to impart step-by-step rotation to said driven shaft; a clutch having coaxial driving and driven members, said driving member being operable by said driven shaft; interengageable teeth on said members having cooperating sloping teeth, whereby, relative axial adjustment of said members will vary the degree of rotation of said driven member in response to driving impulses from said driving member; a pivotally mounted clutch lever operable to axially adjust said clutch members; cam means rotatable on said driving shaft and engageable with the free end of said lever and selectively operable to activate said lever to axially adjust said clutch members; a forked arm on said lever fitting over said driving shaft to maintain said lever aligned with said cam means; spring means biasing said lever toward said cam means; and adjustable means limiting movement of said lever toward said cam means.

3. Step-by-step rotation apparatus comprising, in combination, a shaft; means for imparting step-by-step rotation to said shaft; a sleeve secured to said shaft having diametrically opposite slots therein; a clutch having coaxial driving and driven members, said driven member being rotatable on said sleeve, and said driving member having a hub fitting the projecting end of said shaft and spaced fingers engaged in such slots; interengageable teeth on said members having cooperating sloping teeth, whereby, relative axial adjustment of said members will vary the degree of rotation of said driven member in response to driving impulses from said driving member; and means for adjusting the relative axial positions of said clutch members.

4. Step-by-step rotation apparatus comprising, in combination, a driving shaft; a driven shaft means operable by said driving shaft for imparting step-by-step rotation to said driven shaft; a sleeve secured to said driven shaft having diametrically opposite slots therein; a clutch having coaxial driving and driven members, said driven members being rotatable on said sleeve, and said driving member having a hub fitting the projecting end of said driven shaft and spaced fingers engaged in such slots; interengageable teeth on said members having cooperating sloping teeth, whereby, relative axial adjustment of said members will vary the degree of rotation of said driven member in response to driving impulses from said driving member; a pivotally mounted clutch lever operable to axially adjust said clutch members; cam means rotatable on said driving shaft and engageable with the free end of said lever and selectively operable to activate said lever to axially adjust said clutch members; spring means biasing said lever toward said cam means; and adjustable means limiting movement of said lever toward said cam means.

5. Step-by-step rotation apparatus comprising, in combination, a driving shaft; a driven shaft in spaced parallel relation to said driving shaft; means operable by said driving shaft to impart step-by-step rotation to said driven shaft; a clutch having coaxial driving and driven members, said driving member being operable by said driven shaft; interengageable teeth on said members having cooperating sloping teeth, whereby relative axial adjustment of said members will vary the degree of rotation of said driven member responsive to driving impulses from said driving member; a wheel secured to said driving shaft; a circumferentially tapered arcuate face cam detachably secured to a face of said wheel concentric with said driving shaft; a pivotally mounted clutch lever operable to axially adjust said clutch members; and a roller on the free end of said lever engaging said cam.

LOUIS M. RABINOWITZ.

REFERENCES CITED

The following references are of record in the file of this patent:

UNITED STATES PATENTS

| Number | Name | Date |
| --- | --- | --- |
| 1,476,766 | Reynolds | Dec. 11, 1923 |
| 2,410,708 | Breither et al. | Nov. 5, 1946 |